US009288678B2

(12) United States Patent
Tao et al.

(10) Patent No.: US 9,288,678 B2
(45) Date of Patent: Mar. 15, 2016

(54) METHOD FOR FREQUENCY REUSE IN CELLULAR NETWORK

(71) Applicant: Beijing University of Posts and Telecommunications, Beijing (CN)

(72) Inventors: Xiaofeng Tao, Beijing (CN); Ping Zhang, Beijing (CN); Xiaona Li, Beijing (CN); Qimei Cui, Beijing (CN); Xiaodong Xu, Beijing (CN); Yingyue Xu, Beijing (CN); Waheed ur Rehman, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 265 days.

(21) Appl. No.: 13/896,454

(22) Filed: May 17, 2013

(65) Prior Publication Data

US 2013/0308571 A1 Nov. 21, 2013

(30) Foreign Application Priority Data

May 18, 2012 (CN) .......................... 2012 1 0157270

(51) Int. Cl.
*H04W 16/02* (2009.01)
*H04W 16/30* (2009.01)
*H04W 16/12* (2009.01)

(52) U.S. Cl.
CPC .............. *H04W 16/02* (2013.01); *H04W 16/30* (2013.01); *H04W 16/12* (2013.01)

(58) Field of Classification Search
CPC .......... H04W 72/044; H04W 72/0453; H04W 72/0493; H04L 5/0007
See application file for complete search history.

(56) References Cited

U.S. PATENT DOCUMENTS 6,522,885 B1 * 2/2003 Tang ..................... H04W 16/02
455/446

(Continued)

FOREIGN PATENT DOCUMENTS

| CN | 101409923 A | 4/2009 |
| CN | 101668295 A | 3/2010 |

OTHER PUBLICATIONS

Rahman M., Yanikomeroglu H. "Enhancing Cell-Edge Performance: A Downlink Dynamic Interference Avoidance Scheme With Inter-Cell Coordination" pp. 1414-1425, IEEE Transactions on Wireless Communications, vol. 9, No. 4, Apr. 2010.*
Xu Fang-min, et al. "A Frequency Reuse Scheme for OFDMA Systems", Journal of Electronics & Information Technology, vol. 31, No. 4, Apr. 2009.

(Continued)

*Primary Examiner* — Xavier S. Wong
(74) *Attorney, Agent, or Firm* — McCarter & English, LLP; Jill A. Mello, Esq.; Kia L. Freeman, Esq.

(57) ABSTRACT

The present invention relates to the technical field of wireless communication, and discloses a method for frequency reuse based on cellular network. The method comprises the following steps: dividing the whole cellular network into a plurality of different cell clusters, wherein each cell cluster comprises three cells, every two of them being adjacent to each other; for each cell in a cell cluster, dividing the cell into a central area and an edge area according to the coverage of the cell; dividing the whole available frequency band of the network according to the user distribution and service distribution in the cell cluster; allocating divided frequency bands to the central area and the edge area in the cell cluster respectively according to preset rule; and applying the method for frequency reuse to other cell clusters, thus achieving the frequency reuse of the whole network. With the method, the average spectrum frequency efficiency of the cellular network can be improved, and interference among cells can be effectively suppressed.

7 Claims, 2 Drawing Sheets

(56) References Cited

U.S. PATENT DOCUMENTS

| | | | |
|---|---|---|---|
| 6,654,612 B1 * | 11/2003 | Avidor | H04W 72/02 455/447 |
| 2009/0129401 A1 * | 5/2009 | Kang et al. | 370/431 |
| 2010/0197314 A1 * | 8/2010 | Maaref et al. | 455/450 |
| 2010/0316004 A1 * | 12/2010 | Macias et al. | 370/329 |
| 2014/0004862 A1 * | 1/2014 | Ekemark | 455/443 |

OTHER PUBLICATIONS

Xu Fang-min, et al. "Soft Fractional Frequency Reuse Scheme with Macro Diversity", Acta Electronica Sinica, vol. 35, No. 6A, Jun. 2007.

* cited by examiner

METHOD FOR FREQUENCY REUSE IN CELLULAR NETWORK

RELATED APPLICATIONS

This application claims the benefit of Chinese Application No. CN 201210157270.4, filed May 18, 2012, the entire contents of which is hereby expressly incorporated herein by reference.

TECHNICAL FIELD

The invention relates to the technical field of wireless communication, more particularly to a method for frequency reuse in a cellular network.

BACKGROUND OF THE INVENTION

Orthogonal Frequency Division Multiple Access technology (OFDMA) is widely used in new generation of wireless network, for example, Long Term Evolution (LTE) project of the $3^{rd}$ Generation Partnership Project (3GPP) and Worldwide Inter-operability for Microwave Access (WiMAX) system. In a multiple-cell network, although OFDMA provides frequency diversity and sub-channel power control, interference among edge channels of cells still exists. Frequency reuse is an important method for increasing system capacity, promoting energy efficiency and reducing interference.

At present, a classic frequency reuse factor has several specific options, such as 1, 3, 4, or 7, etc. Frequency reuse factor of 1 represents that neighbor cells use same frequency resource; however, the co-channel interference is serious at edge of cells. Frequency reuse factor of 3 represents that three neighbor cells use different frequency resource; in this case, co-channel interference does not exist among the three cells, but frequency efficiency will be dropped to one-third. Because the requirement in new generation of mobile communication system is high, designing a reasonable method for frequency reuse is necessary. Partial Frequency Reuse (PFR) and Soft Frequency Reuse (SFR) are two new methods for frequency reuse. For PFR, a cell is divided into two parts. In scenario of three sections, the frequency reuse factor of cell central users is 1, while the frequency reuse factor of cell edge users is higher. This solution can highly improve cell edge performance; however, the average throughput of the cells decreases seriously since the reuse factor of the edge users is 3. For the SFR, each cell can use all subcarriers and determine the extent of using a frequency by setting a transmission power threshold; the frequency reuse factor of the system can realize smooth transition. Because the reuse factor of the SFR solution is 1, the average throughput of its cells is better than that of the cells of PFR. However, the performance of SFR will be decreased rapidly with the increase of loading of the system.

The methods as mentioned above are dedicated to guaranteeing higher system spectrum efficiency and relatively low interference among cells as well. Generally, an enhanced frequency reuse solution is, on the basis of classic frequency reuse, improving a certain performance of system, such as average spectrum efficiency of cells, etc., to some extent. For problem of balancing system spectrum efficiency and interference among cells, more effective frequency policies are required in the new generation of wireless cellular network.

SUMMARY OF THE INVENTION

The present invention aims to provide an effective frequency reuse method for improving the average spectrum efficiency of cells and effectively suppressing the interference among cells.

Accordingly, the present invention provides a method for frequency reuse based on cellular network, comprising the following steps:

S1, dividing the whole cellular network into a plurality of different cell clusters, wherein each cell cluster comprises three cells, every two of them being adjacent to each other;

S2, for each cell in a cell cluster, dividing the cell into a central area and an edge area according to the coverage of the cell;

S3, dividing the whole available frequency band of the network; and

S4, allocating divided frequency bands to the central area and the edge area in the cell cluster respectively according to preset rule.

In a preferred embodiment, step S2 specifically includes: for each cell in a cell cluster, dividing the coverage of the cell into n areas, wherein n=13; said area of each cell is divided into three groups according to coverage, i.e., a central area group G1, an edge group G2 and a corner group G3, wherein G1 consists of a central area of each of the cells, G2 consists of at least one area which is located at the edge of each cell and is adjacent to only one of other cells, and G3 consists of at least one area which is located at edge of each cell and is adjacent to more than two of other cells, G2 and G3 forming the edge area group.

In a preferred embodiment, step S3 specifically comprises dividing the whole available frequency band F of the network into m frequency bands which are not overlapped with each other, i.e., f1, f2, f3, ..., fm, wherein m≥7.

In a preferred embodiment, step S4 comprises allocating divided frequency bands to different areas in the cell. Specifically, said group G1 uses one and the same frequency band, said group G2 uses different frequency bands separately along the circumferential direction in the areas of each cell, and said group G3 uses different frequency bands at respective areas of each cell.

In a preferred embodiment, the area included in the edge group is a rectangular area.

In a preferred embodiment, group G2 uses different frequency bands at corresponding areas of different cells.

In a preferred embodiment, coverage of each cell is an area of regular hexahedron.

In a preferred embodiment, the central area uses high frequency band while the edge area uses low frequency band.

In the method for frequency reuse provided by the present invention, the available frequency collection of the cell edge area is finely divided with features of the cell edge area being sufficiently considered. Therefore, the frequency reuse factor of the whole network approaches 1 to a greater extent, thus improving the frequency efficiency of the system effectively. At the same time, because the edge areas of three cells, every two of them being adjacent to each other, use different frequency collections, interference among cells is effectively suppressed, and the system performance is improved.

DETAILED DESCRIPTION OF THE INVENTION

Figure 1:
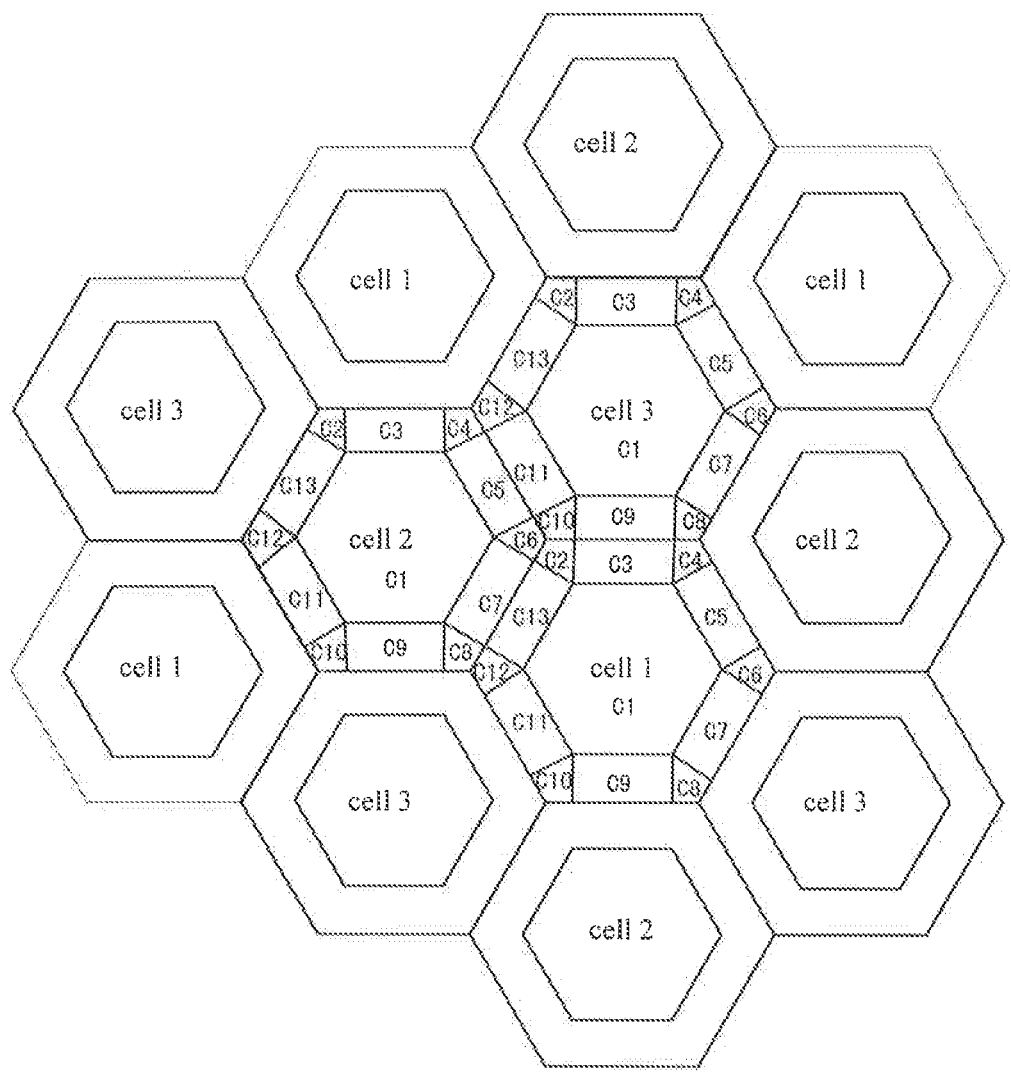
FIG. 1 shows a method for area division according to the present invention.

The method for frequency reuse based on cellular network according to the present invention includes the following steps.

Three cells, every two of them being adjacent to each other, in a cellular system are deemed as a cell cluster, i.e. Cell 1, Cell 2 and Cell 3, every two of them being adjacent to each other, are deemed as a cell cluster. The coverage of each cell is a regular hexahedron area.

For each cell in a cell cluster, the coverage of the cell is divided into 13 areas, i.e., C1 to C13. The 13 areas are divided into three groups, i.e., G1 to G3, according to respective coverage. Among others, G1, consisting of area C1, represents the central area, and the coverage of G1 is a regular hexahedron having the same center as the cell where G1 is located but shorter sides; G2, consisting of areas C3, C5, C7, C9, C11 and C13, represents the main part of the edge area, and the coverage of each area is the rectangular part in the edge area; and G3, consisting of areas C2, C4, C6, C8, C10 and C12, represents other parts of the edge area, and the coverage of each area is a quadrilateral located at the six corners of the cell edge area.

The whole available frequency band F of the system is divided into 7 parts which are not overlapped, i.e., f1, f2, f3, f4, f5, f6 and f7.

Specifically, allocating available frequency to different areas of each cell is as follows.

All users in the first area G1 of each cell use frequency resource of frequency collection f1 for their service. That is, the central area C1 of Cell 1, Cell 2 and Cell 3, every two of them being adjacent to each other, use the same frequency resource f1.

All users in the second area G2 of each cell are divided into two parts, i.e., g1 and g2, wherein g1 includes users of areas C3, C7 and C11 who use the same frequency resource for their service, and g2 includes users of areas C5, C9 and C13 who use the same frequency resource for their service. However, frequency resource used by users of g1 or g2 in different cells may not be the same. For example, users of g1 in Cell 1 may use frequency resource of frequency collection f2 for their service, users of g2 in Cell 1 may use frequency resource of frequency collection f3 for their service, users of g1 in Cell 2 may use frequency resource of frequency collection f4 for their service, users of g2 in Cell 2 may use frequency resource of frequency collection f2 for their service, users of g1 in Cell 3 may use frequency resource of frequency collection f3 for their service, and users of g2 of Cell 3 may use frequency resource of frequency collection f4 for their service.

Users of the third area G3 of each cell use different frequency resource for their service. That is, all users of G3 in Cell 1 use frequency resource of frequency resource collection f5 for their service, users of G3 in Cell 2 use frequency resource of frequency collection f6 for their service, and users of G3 of Cell 3 use frequency resource of frequency collection f7 for their service.

The method as mentioned above is illustrated through a cell cluster as an example, wherein: users of each cells are classified into cell central users and cell edge users; each cell cluster is divided into a plurality of areas according to a certain rule and those areas are allocated with frequency resource according to a certain principle; the way for dividing frequency resource can be adjusted upon situations such as user distribution and service distribution or the like, in the cell cluster; the whole cellular network is divided into different cell clusters, each having three cells every two of them being adjacent to each other, and frequency is allocated by using the above method so as to realize frequency reuse of the whole network finally.

The method can be applied to all other cell clusters. The method can be not only used for frequency resource allocation in an FDD system, but also for time slot resource allocation in a TDD system. The method can be not only used for an omnidirectional antenna system, but also a directional antenna system. The frequency in the frequency collection of the method can be consecutive or disrecte.

Embodiment 1

In the present embodiment, the method for frequency reuse according to the present invention is used in an OFDMA cellular network. By using the method for frequency reuse, interference among cells is suppressed effectively and the frequency efficiency of the system is improved. Moreover, performance of cell edge users is improved greatly by using frequency reuse.

In the present invention, the whole OFDMA cellular network is divided into different cell clusters. Each cell cluster has three cells, every two of them being adjacent to each other. Frequency is allocated to any one of the cell clusters according to the method for frequency reuse of the present invention, and then the same method for frequency reuse is applied to all other cell clusters in the network, so that the solution of the frequency allocation of the whole OFDMA cellular network is completed. Specifically, the method comprises the following steps.

Step 1 As shown in FIG. 1, three cells, every two of them being adjacent to each other, in a cellular system are deemed as a cell cluster, i.e., Cell 1, Cell 2 and Cell 3, every two of them being adjacent to each other, are deemed as a cell cluster. The coverage of each cell is a regular hexahedron area.

Step 2 For each cell in a cell cluster, the coverage of the cell is divided into 13 areas, i.e., C1 to C13. The 13 areas are divided into three groups, i.e., G1 to G3, according to respective coverage. Among others, G1, consisting of area C1, represents the central area, and the coverage of G1 is a regular hexahedron having the same center as the cell where G1 is located but shorter sides; G2, consisting of areas C3, C5, C7, C9, C11 and C13, represents the main part of the edge area, and the coverage of each area is the rectangular part in the edge area; and G3, consisting of areas C2, C4, C6, C8, C10 and C12, represents other parts of the edge area, and the coverage of each area is a quadrilateral located at the six corners of the cell edge area.

Step 3 The whole available frequency band F of the system is divided into 7 parts which are not overlapped, i.e., f1, f2, f3, f4, f5, f6 and f7.

Figure 2:
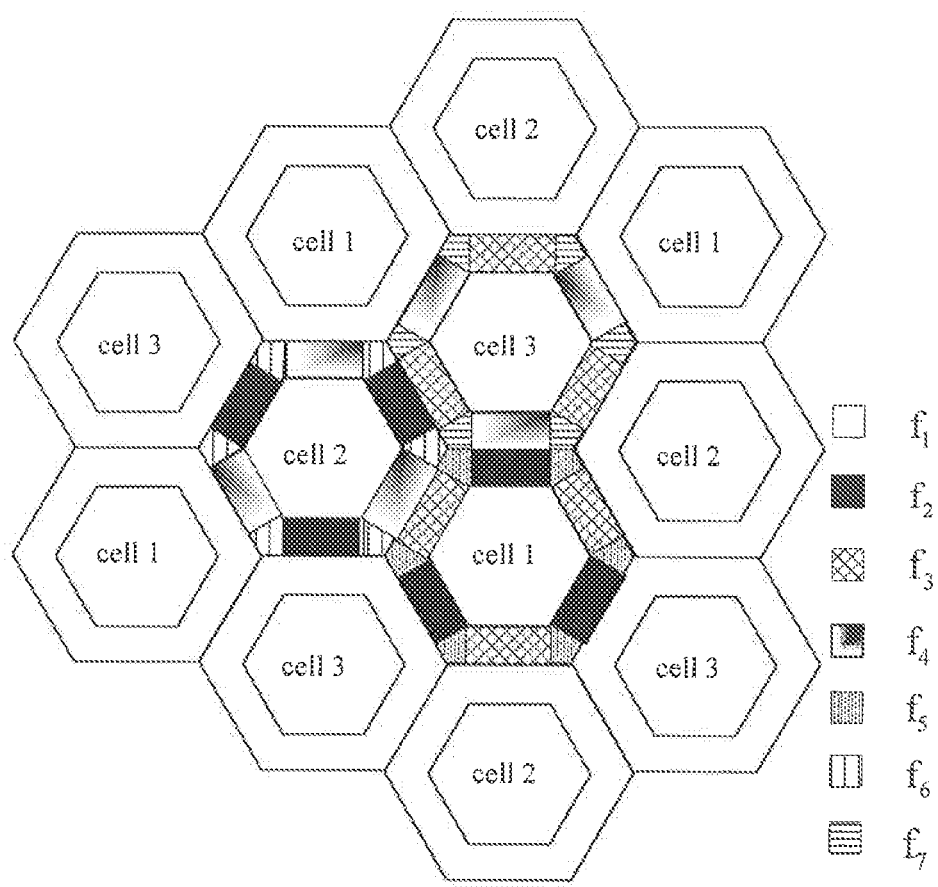
FIG. 2 shows a method for frequency reuse according to the present invention.

Step 4 As shown in FIG. 2, allocating available frequency to different areas of each cell, comprising the following sub-steps.

When all users are located in the first area G1 of each cell, they use frequency resource of frequency collection f1 for their service. That is, the central area C1 of Cell 1, Cell 2 and Cell 3, every two of them being adjacent to each other, use the same frequency resource f1.

When all users are located in the second area G2 of each cell, they are divided into two parts, i.e., g1 and g2, wherein g1 includes users of areas C3, C7 and C11 who use the same frequency resource for their service, and g2 includes users of areas C5, C9 and C13 who use the same frequency resource for their service. However, frequency resource used by users of g1 or g2 in different cells may not be the same. As a particular manner of frequency distribution, users of g1 in Cell 1 may use frequency resource of frequency collection f2 for their service, users of g2 in Cell 1 may use frequency resource of frequency collection f3 for their service, users of g1 in Cell 2 may use frequency resource of frequency collection f4 for their service, users of g2 in Cell 2 may use frequency resource of frequency collection f2 for their service, users of g1 in Cell 3 may use frequency resource of frequency collection f3 for their service, and users of g2 of Cell 3 may use frequency resource of frequency collection f4 for their service.

When users are located in the third area G3 of each cell, a particular manner of frequency distribution is as follows: all users of G3 in Cell 1 use frequency resource of frequency resource collection f5 for their service, users of G3 in Cell 2 use frequency resource of frequency collection f6 for their service, and users of G3 of Cell 3 use frequency resource of frequency collection f7 for their service.

In this way, the process of frequency allocation for OFDMA cellular network is completed.

Embodiment 2

In the present embodiment, the method for frequency reuse according to the present invention is used in downlink FDD LTE system. By using the method for frequency reuse, interference among cells is suppressed effectively and the frequency efficiency of the system is improved. Moreover, performance of cell edge users is improved greatly by using frequency reuse.

In the present invention, the whole cellular network is divided into different cell clusters. Each cell cluster has three cells, every two of them being adjacent to each other. Frequency is allocated to any one of the cell clusters according to the method for frequency reuse of the present invention, and then the same method for frequency reuse is applied to all other cell clusters in the network, so that the solution of the frequency allocation of the whole cellular network is completed. Specifically, the method comprises the following steps.

Step 1 As shown in FIG. 1, three cells, every two of them being adjacent to each other, in a cellular system are deemed as a cell cluster, i.e., Cell 1, Cell 2 and Cell 3, every two of them being adjacent to each other, are deemed as a cell cluster. The coverage of each cell is a regular hexahedron area.

Step 2 For each cell in a cell cluster, the coverage of the cell is divided into 13 areas, i.e., C1 to C13. The 13 areas are divided into three groups, i.e., G1 to G3, according to respective coverage. Among others, G1, consisting of area C1, represents the central area, and the coverage of G1 is a regular hexahedron having the same center as the cell where G1 is located but shorter sides; G2, consisting of areas C3, C5, C7, C9, C11 and C13, represents the main part of the edge area, and the coverage of each area is the rectangular part in the edge area; and G3, consisting of areas C2, C4, C6, C8, C10 and C12, represents other parts of the edge area, and the coverage of each area is a quadrilateral located at the six corners of the cell edge area.

Step 3 The operation frequency band supported by the downlink FDD LTE system is shown as Table 1, wherein there are a total of 23 available operation sub-frequency bands.

TABLE 1

| The operation frequency band supported by the downlink FDD LTE system | |
|---|---|
| downlink FDD LTE system | |
| 1 | 2110 MHz-2170 MHz |
| 2 | 1930 MHz-1990 MHz |
| 3 | 1805 MHz-1880 MHz |
| 4 | 2110 MHz-2155 MHz |
| 5 | 869 MHz-894 MHz |
| 6 | 875 MHz-885 MHz |

TABLE 1-continued

| The operation frequency band supported by the downlink FDD LTE system | |
|---|---|
| downlink FDD LTE system | |
| 7 | 2620 MHz-2690 MHz |
| 8 | 925 MHz-960 MHz |
| 9 | 1844.9 MHz-1879.9 MHz |
| 10 | 2110 MHz-2170 MHz |
| 11 | 1475.9 MHz-1495.9 MHz |
| 12 | 728 MHz-746 MHz |
| 13 | 746 MHz-756 MHz |
| 14 | 758 MHz-768 MHz |
| 15 | reserved frequency band |
| 16 | reserved frequency band |
| 17 | 734 MHz-746 MHz |
| 18 | 860 MHz-875 MHz |
| 19 | 875 MHz-890 MHz |
| 20 | 791 MHz-821 MHz |
| 21 | 1495.9 MHz-1510.9 MHz |
| 22 | 3510 MHz-3600 MHz |
| 23 | 2180 MHz-2200 MHz |
| 24 | 1525 MHz-1559 MHz |
| 25 | 1930 MHz-1995 MHz |
| 26 | 859 MHz-894 MHz |

Note:
sub-frequency band 6 is not available

The whole available frequency band is configured as a frequency pool E The whole or part of the frequency band in the frequency pool is selected out, and the selected frequency band into 7 parts which are not overlapped, i.e., f1, f2, f3, f4, f5, f6 and f7.

Step 4 As shown in FIG. 2, allocating available frequency to different areas of each cell, wherein in view of coverage, the cell center uses high frequency band as much as possible, and the cell edge uses low frequency band as much as possible. Specifically, it comprises the following substeps.

When all users are located in the first area G1 of each cell, they use frequency resource of frequency collection f1 for their service. That is, the central area C1 of Cell 1, Cell 2 and Cell 3, every two of them being adjacent to each other, use the same frequency resource f1.

When all users are located in the second area G2 of each cell, they are divided into two parts, i.e., g1 and g2, wherein g1 includes users of areas C3, C7 and C11 who use the same frequency resource for their service, and g2 includes users of areas C5, C9 and C13 who use the same frequency resource for their service. However, frequency resource used by users of g1 or g2 in different cells may not be the same. As a particular manner of frequency distribution, users of g1 in Cell 1 may use frequency resource of frequency collection f2 for their service, users of g2 in Cell 1 may use frequency resource of frequency collection f3 for their service, users of g1 in Cell 2 may use frequency resource of frequency collection f4 for their service, users of g2 in Cell 2 may use frequency resource of frequency collection f2 for their service, users of g1 in Cell 3 may use frequency resource of frequency collection f3 for their service, and users of g2 of Cell 3 may use frequency resource of frequency collection f4 for their service.

When users are located in the third area G3 of each cell, a particular manner of frequency distribution is as follows: all users of G3 in Cell 1 use frequency resource of frequency resource collection f5 for their service, users of G3 in Cell 2 use frequency resource of frequency collection f6 for their service, and users of G3 of Cell 3 use frequency resource of frequency collection f7 for their service.

In this way, the process of frequency allocation for downlink FDD LTE system is completed.

The embodiments as mentioned above should be considered as illustrative and not restrictive. All changes, equivalents and variations, which come within the spirit and scope of the present invention and are known to one skilled in the art, fall within the protection scope of the present invention.

The invention claimed is:

1. A method for frequency reuse based on cellular network, comprising the following steps:
    S1, dividing, by a processor, the whole cellular network into a plurality of cell clusters, wherein each cell cluster comprises three cells, every two of them being adjacent to each other;
    S2, for each cell in a cell cluster, dividing the cell, by the processor, into a central area group G1, an edge group G2, and a corner group G3;
    S3, dividing, by the processor, the whole available frequency band of the network; and
    S4, allocating divided frequency bands to the central area group G1, the edge group G2, and the corner group G3 in the cell cluster, by the processor,
    wherein the central area group G1 consists of a central area of each of the cells, wherein the edge group G2 consists of at least one area which is located at the edge of each cell and adjacent to only one other cell, and wherein the corner group G3 consists of at least one area which is located at the edge of each cell and adjacent to at least two other cells.

2. The method according to claim 1, wherein said step S3 comprises dividing the whole available frequency band F of the network, by the processor, into m frequency bands which are not overlapped with each other, f1, f2, f3, . . . , fm, wherein m≥7.

3. The method according to claim 2, wherein said group G1 uses one and the same frequency band, said group G2 uses different frequency bands separately along the circumferential direction in the areas of each cell, and said group G3 uses different frequency bands at respective areas of each cell.

4. The method according to claim 3, wherein said group G2 uses different frequency bands at corresponding areas of different cells.

5. The method according to claim 1, wherein the area included in the edge group is a rectangular area.

6. The method according to claim 1, wherein the coverage of each cell is an area of regular hexahedron.

7. The method of claim 1, wherein the whole available frequency band of the network is divided in a dynamically adjustable manner.

* * * * *